(12) United States Patent
Cao et al.

(10) Patent No.: US 11,875,439 B2
(45) Date of Patent: *Jan. 16, 2024

(54) AUGMENTED EXPRESSION SYSTEM

(71) Applicant: Snap Inc., Santa Monica, CA (US)

(72) Inventors: Chen Cao, Los Angeles, CA (US);
Yang Gao, Toronto (CA); Zehao Xue, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/849,397

(22) Filed: Apr. 15, 2020

(65) Prior Publication Data

US 2020/0242826 A1 Jul. 30, 2020

Related U.S. Application Data

(63) Continuation of application No. 16/387,092, filed on Apr. 17, 2019, now Pat. No. 10,719,968.

(Continued)

(51) Int. Cl.
| | | |
|---|---|---|
| *G06T 13/20* | (2011.01) | |
| *G06K 9/00* | (2022.01) | |
| *G06T 7/73* | (2017.01) | |
| *G06T 9/00* | (2006.01) | |
| *G06T 19/20* | (2011.01) | |
| *G06T 13/40* | (2011.01) | |
| *G06T 7/246* | (2017.01) | |

(Continued)

(52) U.S. Cl.
CPC .............. *G06T 13/20* (2013.01); *G06T 7/73* (2017.01); *G06T 13/40* (2013.01); *G06T 19/006* (2013.01); *G06T 19/20* (2013.01); *G06V 40/174* (2022.01); *G06T 2207/30201* (2013.01)

(58) Field of Classification Search
None
See application file for complete search history.

(56) References Cited

U.S. PATENT DOCUMENTS

| | | | |
|---|---|---|---|
| 5,754,939 | A | 5/1998 | Herz et al. |
| 5,880,731 | A | 3/1999 | Liles et al. |

(Continued)

FOREIGN PATENT DOCUMENTS

| | | |
|---|---|---|
| CA | 2887596 A1 | 7/2015 |
| CN | 109863532 | 6/2019 |

(Continued)

OTHER PUBLICATIONS

Affectiva, "Emotion AI 101: All About Emotion Detection and Affectiva's Emotion Metrics", 2017, retrieved from "https://blog.affectiva.com/emotion-ai-101-all-about-emotion-detection-and-affectivas-emotion-metrics", Accessed Nov. 6, 2021 (Year: 2017).*

(Continued)

*Primary Examiner* — Michael J Cobb
(74) *Attorney, Agent, or Firm* — Schwegman Lundberg & Woessner, P.A.

(57) ABSTRACT

Embodiments described herein relate to an augmented expression system to generate and cause display of a specially configured interface to present an augmented reality perspective. The augmented expression system receives image and video data of a user and tracks facial landmarks of the user based on the image and video data, in real-time to generate and present a 3-dimensional (3D) bitmoji of the user.

12 Claims, 12 Drawing Sheets

Related U.S. Application Data

(60) Provisional application No. 62/659,337, filed on Apr. 18, 2018.

(51) Int. Cl.
*G06T 19/00* (2011.01)
*G06V 40/16* (2022.01)

(56) References Cited

U.S. PATENT DOCUMENTS

| | | | |
|---|---|---|---|
| 6,023,270 A | 2/2000 | Brush et al. |
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,223,165 B1 | 4/2001 | Lauffer |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,772,195 B1 | 8/2004 | Hatlelid et al. |
| 6,842,779 B1 | 1/2005 | Nishizawa |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,342,587 B2 | 3/2008 | Danzig et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,468,729 B1 | 12/2008 | Levinson |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,636,755 B2 | 12/2009 | Blattner et al. |
| 7,639,251 B2 | 12/2009 | Gu et al. |
| 7,703,140 B2 | 4/2010 | Nath et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,570,907 B2 | 10/2013 | Garcia, Jr. et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,745,132 B2 | 6/2014 | Obradovich |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,256,860 B2 | 2/2016 | Herger et al. |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,443,227 B2 | 9/2016 | Evans et al. |
| 9,460,541 B2 | 10/2016 | Li et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |

(56) References Cited

U.S. PATENT DOCUMENTS

| | | | |
|---|---|---|---|
| 9,592,449 B2 | 3/2017 | Barbalet et al. |
| 9,628,950 B1 | 4/2017 | Noeth et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,785,796 B1 | 10/2017 | Murphy et al. |
| 9,792,714 B2 | 10/2017 | Li et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,948,594 B2 | 4/2018 | Stan et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,719,968 B2 | 7/2020 | Cao et al. |
| 10,726,603 B1 * | 7/2020 | Al Majid ............ G06F 3/04845 |
| 2002/0047868 A1 | 4/2002 | Miyazawa |
| 2002/0067362 A1 | 6/2002 | Agostino Nocera et al. |
| 2002/0144154 A1 | 10/2002 | Tomkow |
| 2002/0169644 A1 | 11/2002 | Greene |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0162419 A1 | 7/2005 | Kim et al. |
| 2005/0198128 A1 | 9/2005 | Anderson |
| 2005/0206610 A1 | 9/2005 | Cordelli |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2006/0294465 A1 | 12/2006 | Ronen et al. |
| 2007/0002057 A1 | 1/2007 | Danzig et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0214216 A1 | 9/2007 | Carrer et al. |
| 2007/0233801 A1 | 10/2007 | Eren et al. |
| 2007/0266173 A1 | 11/2007 | Wong et al. |
| 2008/0055269 A1 | 3/2008 | Lemay et al. |
| 2008/0120409 A1 | 5/2008 | Sun et al. |
| 2008/0158222 A1 | 7/2008 | Li et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0016617 A1 | 1/2009 | Bregman-amitai et al. |
| 2009/0042588 A1 | 2/2009 | Lottin et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0132453 A1 | 5/2009 | Hangartner et al. |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0082427 A1 | 4/2010 | Burgener et al. |
| 2010/0115426 A1 | 5/2010 | Liu et al. |
| 2010/0131880 A1 | 5/2010 | Lee et al. |
| 2010/0162149 A1 | 6/2010 | Sheleheda et al. |
| 2010/0185665 A1 | 7/2010 | Horn et al. |
| 2010/0203968 A1 | 8/2010 | Gill et al. |
| 2010/0227682 A1 | 9/2010 | Reville et al. |
| 2010/0306669 A1 | 12/2010 | Della Pasqua |
| 2011/0093780 A1 | 4/2011 | Dunn |
| 2011/0099507 A1 | 4/2011 | Nesladek et al. |
| 2011/0115798 A1 | 5/2011 | Nayar et al. |
| 2011/0145564 A1 | 6/2011 | Moshir et al. |
| 2011/0148864 A1 | 6/2011 | Lee et al. |
| 2011/0202598 A1 | 8/2011 | Evans et al. |
| 2011/0213845 A1 | 9/2011 | Logan et al. |
| 2011/0239136 A1 | 9/2011 | Goldman et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0113106 A1 | 5/2012 | Choi et al. |
| 2012/0124458 A1 | 5/2012 | Cruzada |
| 2012/0130717 A1 * | 5/2012 | Xu ........................ H04L 51/10 |
| | | 704/258 |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0103760 A1 | 4/2013 | Golding et al. |
| 2013/0194301 A1 | 8/2013 | Robbins et al. |
| 2013/0201187 A1 | 8/2013 | Tong et al. |
| 2013/0235045 A1 | 9/2013 | Corazza et al. |
| 2013/0249948 A1 | 9/2013 | Reitan |
| 2013/0257877 A1 | 10/2013 | Davis |
| 2013/0290443 A1 | 10/2013 | Collins et al. |
| 2014/0032682 A1 | 1/2014 | Prado et al. |
| 2014/0043329 A1 | 2/2014 | Wang et al. |
| 2014/0055554 A1 | 2/2014 | Du et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0070351 A1 | 3/2015 | Tarquini et al. |
| 2015/0121251 A1 * | 4/2015 | Kadirvel ........... H04M 1/72427 |
| | | 715/753 |
| 2015/0199082 A1 | 7/2015 | Scholler et al. |
| 2015/0206349 A1 | 7/2015 | Rosenthal et al. |
| 2015/0213604 A1 | 7/2015 | Li et al. |
| 2015/0227602 A1 | 8/2015 | Ramu et al. |
| 2015/0286867 A1 | 10/2015 | Malesa et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 * | 4/2016 | Allen ..................... H04L 51/10 |
| | | 709/206 |
| 2016/0127894 A1 | 5/2016 | Kahn et al. |
| 2016/0134840 A1 | 5/2016 | Mcculloch |
| 2016/0180887 A1 | 6/2016 | Sehn |
| 2016/0234149 A1 | 8/2016 | Tsuda et al. |

(56) References Cited

U.S. PATENT DOCUMENTS

| | | |
|---|---|---|
| 2016/0277419 A1 | 9/2016 | Allen et al. |
| 2016/0321708 A1 | 11/2016 | Sehn |
| 2016/0328875 A1* | 11/2016 | Fang ................. G06K 9/00255 |
| 2016/0359957 A1 | 12/2016 | Laliberte |
| 2016/0359987 A1 | 12/2016 | Laliberte |
| 2016/0361653 A1* | 12/2016 | Zhang ................... A63F 13/655 |
| 2017/0018289 A1* | 1/2017 | Morgenstern ........ G11B 27/036 |
| 2017/0080346 A1 | 3/2017 | Abbas |
| 2017/0083506 A1* | 3/2017 | Liu ......................... G06F 40/166 |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0161382 A1 | 6/2017 | Ouimet et al. |
| 2017/0199855 A1 | 7/2017 | Fishbeck |
| 2017/0235848 A1 | 8/2017 | Van Deusen et al. |
| 2017/0263029 A1 | 9/2017 | Yan et al. |
| 2017/0286752 A1 | 10/2017 | Gusarov et al. |
| 2017/0287006 A1 | 10/2017 | Azmoodeh et al. |
| 2017/0295250 A1 | 10/2017 | Samaranayake et al. |
| 2017/0310934 A1 | 10/2017 | Du et al. |
| 2017/0312634 A1 | 11/2017 | Ledoux et al. |
| 2017/0344854 A1* | 11/2017 | Behringer .......... G06K 9/00624 |
| 2017/0374003 A1 | 12/2017 | Allen et al. |
| 2017/0374508 A1 | 12/2017 | Davis et al. |
| 2018/0005420 A1 | 1/2018 | Bondich et al. |
| 2018/0024726 A1* | 1/2018 | Hviding .............. G06F 3/04845 |
| | | 715/204 |
| 2018/0026925 A1* | 1/2018 | Kennedy ................. H04L 51/10 |
| | | 715/753 |
| 2018/0047200 A1 | 2/2018 | O'hara et al. |
| 2018/0089880 A1* | 3/2018 | Garrido ............ H04N 21/44245 |
| 2018/0113587 A1 | 4/2018 | Allen et al. |
| 2018/0115503 A1 | 4/2018 | Baldwin et al. |
| 2018/0197343 A1 | 7/2018 | Hare et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0035149 A1* | 1/2019 | Chen ......................... G06T 15/04 |
| 2019/0057616 A1 | 2/2019 | Cohen et al. |
| 2019/0126152 A1* | 5/2019 | Taylor ..................... H04L 51/10 |
| 2019/0182304 A1 | 6/2019 | Fok et al. |
| 2019/0188920 A1 | 6/2019 | Mcphee et al. |
| 2019/0213773 A1* | 7/2019 | Lee ......................... H04L 67/535 |
| 2019/0228556 A1* | 7/2019 | Wang ...................... G06T 17/00 |
| 2019/0228570 A1* | 7/2019 | Tran ........................ G06T 17/00 |
| 2019/0250934 A1* | 8/2019 | Kim ........................ G06F 3/017 |
| 2019/0266807 A1* | 8/2019 | Lee ......................... G06T 13/40 |
| 2019/0286889 A1* | 9/2019 | DeCovnick ........ G06K 9/00302 |
| 2019/0325631 A1 | 10/2019 | Cao et al. |
| 2019/0370715 A1 | 12/2019 | Fikani |
| 2020/0026347 A1 | 1/2020 | El Kaliouby et al. |
| 2021/0295018 A1* | 9/2021 | Gusarov ................. G06T 13/40 |
| 2021/0366613 A1* | 11/2021 | Schler ................... A61B 5/4088 |

FOREIGN PATENT DOCUMENTS

| | | |
|---|---|---|
| CN | 110168478 | 8/2019 |
| CN | 112041891 A | 12/2020 |
| EP | 2184092 | 5/2010 |
| JP | 2001230801 | 8/2001 |
| JP | 5497931 | 3/2014 |
| KR | 20130022434 A | 3/2013 |
| KR | 101445263 | 9/2014 |
| KR | 20160088223 A | 7/2016 |
| KR | 20170095817 A | 8/2017 |
| WO | 2003094072 | 11/2003 |
| WO | 2004095308 | 11/2004 |
| WO | 2006107182 | 10/2006 |
| WO | 2007134402 | 11/2007 |
| WO | WO-2008096099 A1 | 8/2008 |
| WO | WO-2012000107 A1 | 1/2012 |
| WO | 2012139276 | 10/2012 |
| WO | WO-2013008251 A2 | 1/2013 |
| WO | WO-2013027893 A1 | 2/2013 |
| WO | 2013152454 | 10/2013 |
| WO | 2013166588 | 11/2013 |
| WO | 2014031899 | 2/2014 |
| WO | WO-2014194262 A2 | 12/2014 |
| WO | WO-2014194439 A1 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016090605 A1 | 6/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | 2018081013 | 5/2018 |
| WO | 2018102562 | 6/2018 |
| WO | 2018129531 | 7/2018 |
| WO | 2019089613 | 5/2019 |
| WO | WO-2019204464 A1 | 10/2019 |

OTHER PUBLICATIONS

Emma Sax, "Modeling Facial Expressions in 3D Avatars from 2D Images", 2016, UMM CSci Senior Seminar Conference, Morris, MN, retrieved from "https://umm-csci.github.io/senior-seminar/seminars/fall2016/Sax.pdf" (Year: 2016).*

"U.S. Appl. No. 16/387,092, Examiner Interview Summary dated Feb. 18, 2020", 3 pgs.

"U.S. Appl. No. 16/387,092, Final Office Action dated Feb. 5, 2020", 18 pgs.

"U.S. Appl. No. 16/387,092, Non Final Office Action dated Jan. 3, 2020", 16 pgs.

"U.S. Appl. No. 16/387,092, Notice of Allowance dated Mar. 12, 2020", 9 pgs.

"U.S. Appl. No. 16/387,092, Response filed Jan. 14, 2020 to Non Final Office Action dated Jan. 3, 2020", 16 pgs.

"U.S. Appl. No. 16/387,092, Response filed Feb. 11, 2020 to Final Office Action dated Feb. 5, 2020", 12 pgs.

"International Application Serial No. PCT/US2019/027900, International Search Report dated Jul. 8, 2019", 29 pgs.

"International Application Serial No. PCT/US2019/027900, Written Opinion dated Jul. 8, 2019", 46 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Kang, Jun Kyu, "", English translation of Korean Patent Publication KR-20130022434-A, (2013).

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for IOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

U.S. Appl. No. 16/387,092 U.S. Pat. No. 10,719,968, filed Apr. 17, 2019, Augmented Expression System.

(56) References Cited

OTHER PUBLICATIONS

"International Application Serial No. PCT/US2019/027900, International Preliminary Report on Patentability dated Oct. 29, 2020", 7 pgs.

"European Application Serial No. 19724973.3, Response Filed May 25, 2021 to Communication pursuant to Rules 161(1) and 162 EPC dated Nov. 25, 2020", 19 pgs.

"Korean Application Serial No. 10-2020-7032843, Notice of Preliminary Rejection dated Mar. 17, 2022", w/ English Translation, 13 pgs.

"Korean Application Serial No. 10-2020-7032843, Response filed Jun. 16, 2022 to Notice of Preliminary Rejection dated Mar. 17, 2022", w/ English claims, 25 pgs.

"Korean Application Serial No. 10-2020-7032843, Notice of Preliminary Rejection dated Apr. 6, 2023", w/ English Translation, 14 pgs.

"Korean Application Serial No. 10-2020-7032843, Office Action dated Dec. 15, 2022", w/ English Translation, 7 pgs.

\* cited by examiner

AUGMENTED EXPRESSION SYSTEM

CLAIM OF PRIORITY

This application is a continuation of U.S. patent application Ser. No. 16/387,092, filed on Apr. 17, 2019, which claims the benefit of priority to U.S. Provisional Application Ser. No. 62/659,337, filed on Apr. 18, 2018, which applications are incorporated herein by reference in their entireties.

TECHNICAL FIELD

Embodiments of the present disclosure relate generally to mobile computing technology and, more particularly, but not by way of limitation, to systems for generating and displaying augmented reality interfaces.

BACKGROUND

Augmented reality (AR), is a live direct or indirect view of a physical, real-world environment whose elements are augmented by computer-generated sensory inputs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
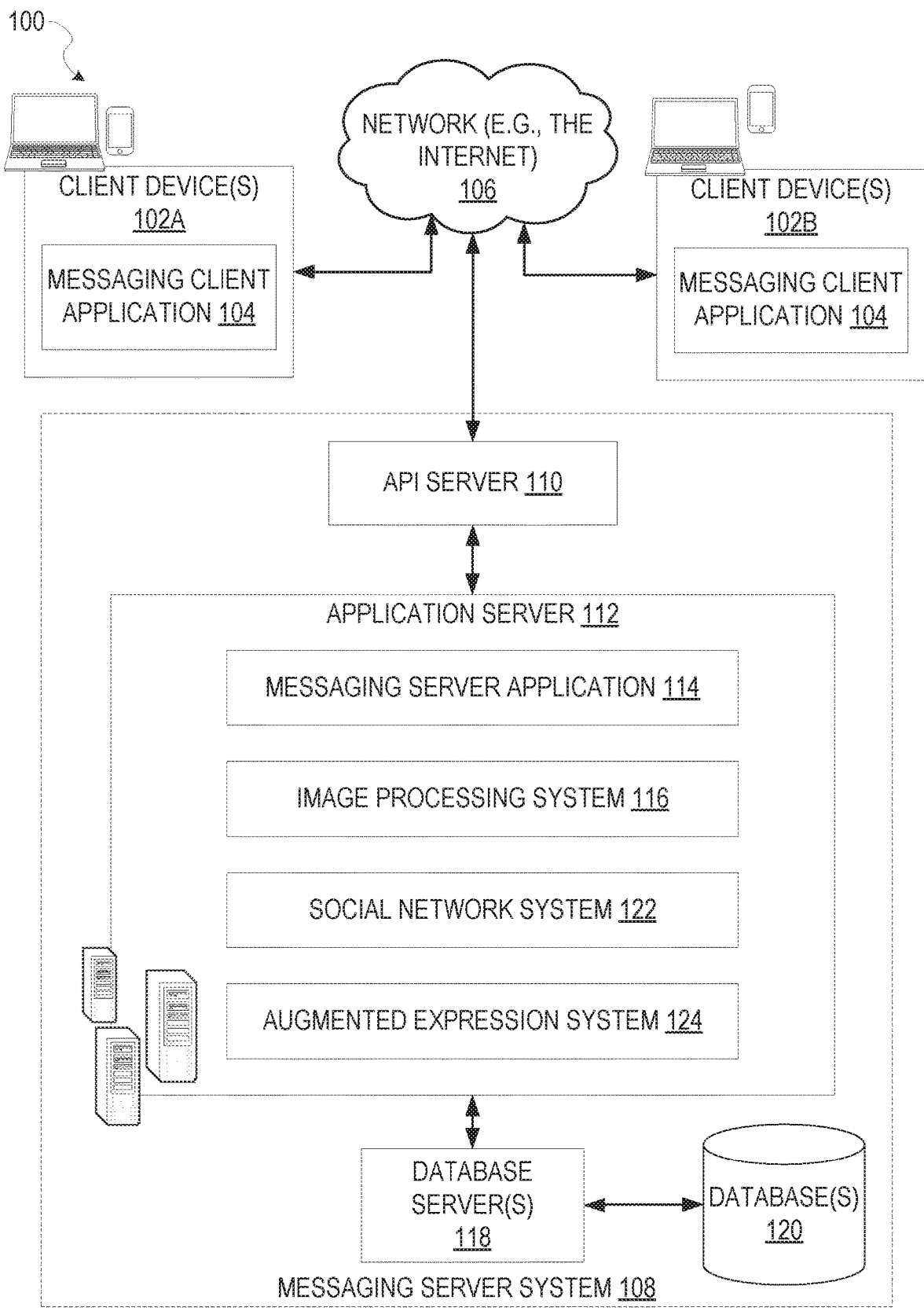
FIG. 1 is a block diagram showing an example messaging system for exchanging data (e.g., messages and associated content) over a network in accordance with some embodiments, wherein the messaging system includes an augmented expression system.

Embodiments described herein relate to an augmented expression system to generate and cause display of a specially configured interface to present an augmented reality perspective. The augmented expression system receives image and video data of a user and tracks facial landmarks of the user based on the image and video data, in real-time to generate and present a 3-dimensional (3D) bitmoji of the user. The system presents an augmented reality display that includes a depiction of the user that includes an augmented reality 3D bitmoji head and elements, which are overlaid at locations in the presentation of the image data. For example, a user may display, stream, or record a video that depicts themselves and their surroundings. The system detects the presence of facial landmarks, and in response, "replaces" the user's head with a 3D bitmoji head which mimics and tracks facial expressions movements of the user.

The augmented expression system receives image and video data from a camera associated with a client device (e.g., a front facing camera), wherein the image and video data includes a set of facial landmarks of a user. In response to detecting the presence of the set of facial landmarks, the system generates a 3D model (e.g., a 3D Bitmoji) based on the set of facial landmarks, overlays the 3D model at a position over the set of facial landmarks in a presentation of the image data, and dynamically animates the 3D model based on detected movements of the set of facial landmarks, such as by facial tracking.

In some embodiments, the system identifies a user or users based on the set of facial landmarks depicted by the image data, and generates the 3D model based on a user profile associated with the user. For example, a user may define display characteristics of a 3D bitmoji in a user profile by selecting a particular 3D bitmoji from among a set of 3D bitmoji, or may configure a 3D bitmoji based on selections of individual components of the 3D bitmoji, such as facial features, colors, hair styles, eye color, as well as accessories (e.g., glasses, hats, sunglasses, monocles). In further embodiments, the system generates the 3D bitmoji based on attributes of the set of facial landmarks of the user, For example, the attributes may include distances and slopes between various facial landmarks, size and shape of facial landmarks, as well as a complexion of the user. The system selects individual components of the 3D bitmoji based on the attributes of the facial landmarks.

The augmented expression system identifies a facial expression of the user based on facial landmark tracking techniques applied to the set of facial landmarks depicted by the image data. The augmented expression system receives inputs as movements and positions of the facial landmarks relative to one another via a facial tracking module. For example, the facial tracking module receives inputs that include a landmark identifier (e.g., nose, mouth, left eye, right eye), an input value that indicates how much the facial landmark has moved or changed relative to a static position, and a movement direction that indicates a direction of the movement. Based on the inputs, and combinations of the inputs, the facial tracking module of the augmented expression system determines an expression of the user. For example, the system may track the user's eye brows simultaneously raise, while the user's mouth opens, and in response determine that the movements and positions of the facial landmarks correspond to a "surprised" expression.

The augmented expression system includes a data repository that includes expression definitions, wherein the expression definitions comprise a mapping of various facial tracking inputs to expressions. The expressions comprise display instructions for the 3D bitmoji, beyond simply causing the 3D bitmoji to mimic the movements and positions of the set of facial landmarks of the user. For example, display instructions may include a 3D graphical element (e.g., a balloon, confetti, hearts) to be presented within the presentation of the image data in response to identifying a particular expression, or by exaggerating one or more facial landmarks to emphasize an expression (e.g., drop jaw, eyes pop out of head, eyes change to stylized "X"). The user may additionally be able to interact with the 3D graphical elements by providing further inputs as movements of facial landmarks (e.g., winking and eye, puckering or blowing, etc.), or as tactile inputs into a touch enabled device.

The augmented expression system facilitates the sharing and distribution of content that includes the 3D bitmoji. For example, a user may stream or record a video that comprises a composite presentation that includes the 3D bitmoji and video. In some embodiments, a user may select a previously recorded image or video and cause the augmented expression system to augment the previously recorded image or video with a display of the 3D bitmoji that mimics the facial movements and expressions of the user. In further embodiments, the user may record or stream a composite presentation that includes a display of the 3D bitmoji in real-time, such that the 3D bitmoji is rendered onto an image or video as the image data is received at the client device.

A user may additionally share or distribute the composite presentation that includes the 3D bitmoji by assigning the 3D bitmoji and the associated image data to a message to be distributed to one or more recipients. In response to assigning the 3D bitmoji to the message, the system generates a flattened presentation of the composite presentation, based on the image data and the 3D bitmoji. The user may assign or transmit the flattened presentation to one or more recipients (e.g., as a message or by adding the flattened presentation to a story associated with a user profile of the user).

In further embodiments, the system may transmit the image data that depicts the user and the 3D bitmoji separately to one or more recipients, and cause the recipients to generate a presentation of the image data that comprises a display of the 3D bitmoji at a position within the image data based on the set of facial landmarks. For example, the system may segment the 3D bitmoji into a set of regions, wherein each region corresponds to a distinct facial landmark from among the set of facial landmarks. Upon receiving the 3D bitmoji and the image data that comprises the set of facial landmarks at the recipient devices, the system causes the recipient devices to generate a presentation of the image data by presenting the 3D bitmoji at a location in the image data based on the locations of each of the facial landmarks.

In some embodiments, the user may transmit 3D bitmoji instructions that enable recipients of the 3D bitmoji instructions to display the 3D bitmoji on content created at their personal devices. For example, a user may configure a 3D bitmoji by selecting one or more bitmoji components and attributes (e.g., head shape, color, accessories, etc.). The user assigns an identifier to the 3D bitmoji (e.g., "Angry Putin"), and the augmented expression system indexes and stores the 3D bitmoji instructions and the identifier at a memory location associated with the user profile of the user. Recipients of the 3D bitmoji instructions may generate augmented reality presentations that include a display of the 3D bitmoji (e.g., "Angry Putin").

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a augmented expression system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
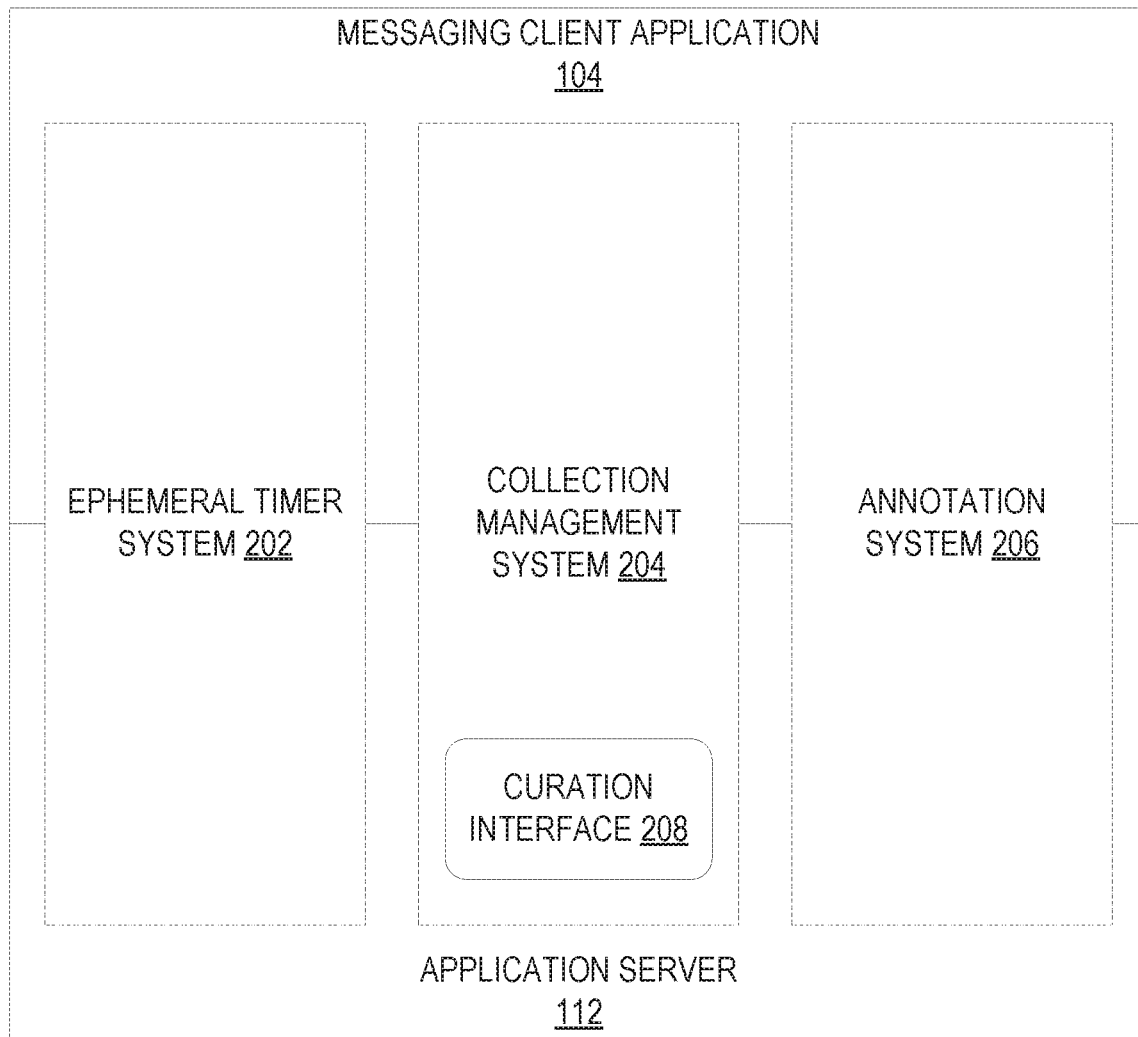
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content, such as 3D bitmoji, permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data, 3D bitmoji, flattened presentations of 3D bitmoji). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models, such as those generated by the augmented expression system 124. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
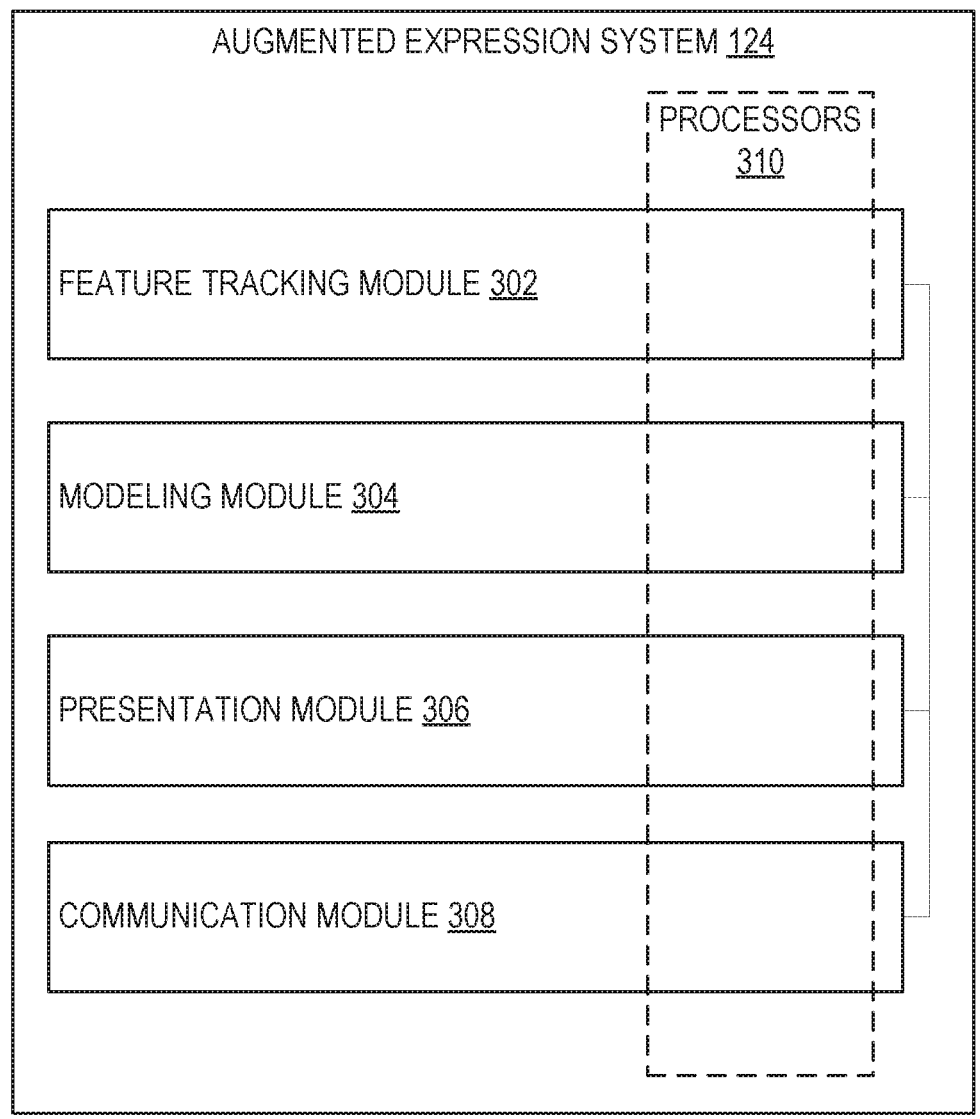
FIG. 3 is a block diagram illustrating various modules of an augmented expression system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the augmented expression system 124 that configure the augmented expression system 124 to generate and display an augmented reality presentation based on image data and a 3D bitmoji, according to some example embodiments. The augmented expression system 124 is shown as including a feature tracking module 302, a modeling module 304, a presentation module 306, and a communication module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the augmented expression system 124 may physically include an arrangement of one or more of the processors 310 (e.g., a subset of or among the one or more processors of the machine) configured to perform the operations described herein for that module. As another example, any module of the augmented expression system 124 may include software, hardware, or both, that configure an arrangement of one or more processors 310 (e.g., among the one or more processors of the machine) to perform the operations described herein for that module. Accordingly, different modules of the augmented expression system 124 may include and configure different arrangements of such processors 310 or a single arrangement of such processors 310 at different points in time. Moreover, any two or more modules of the augmented expression system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
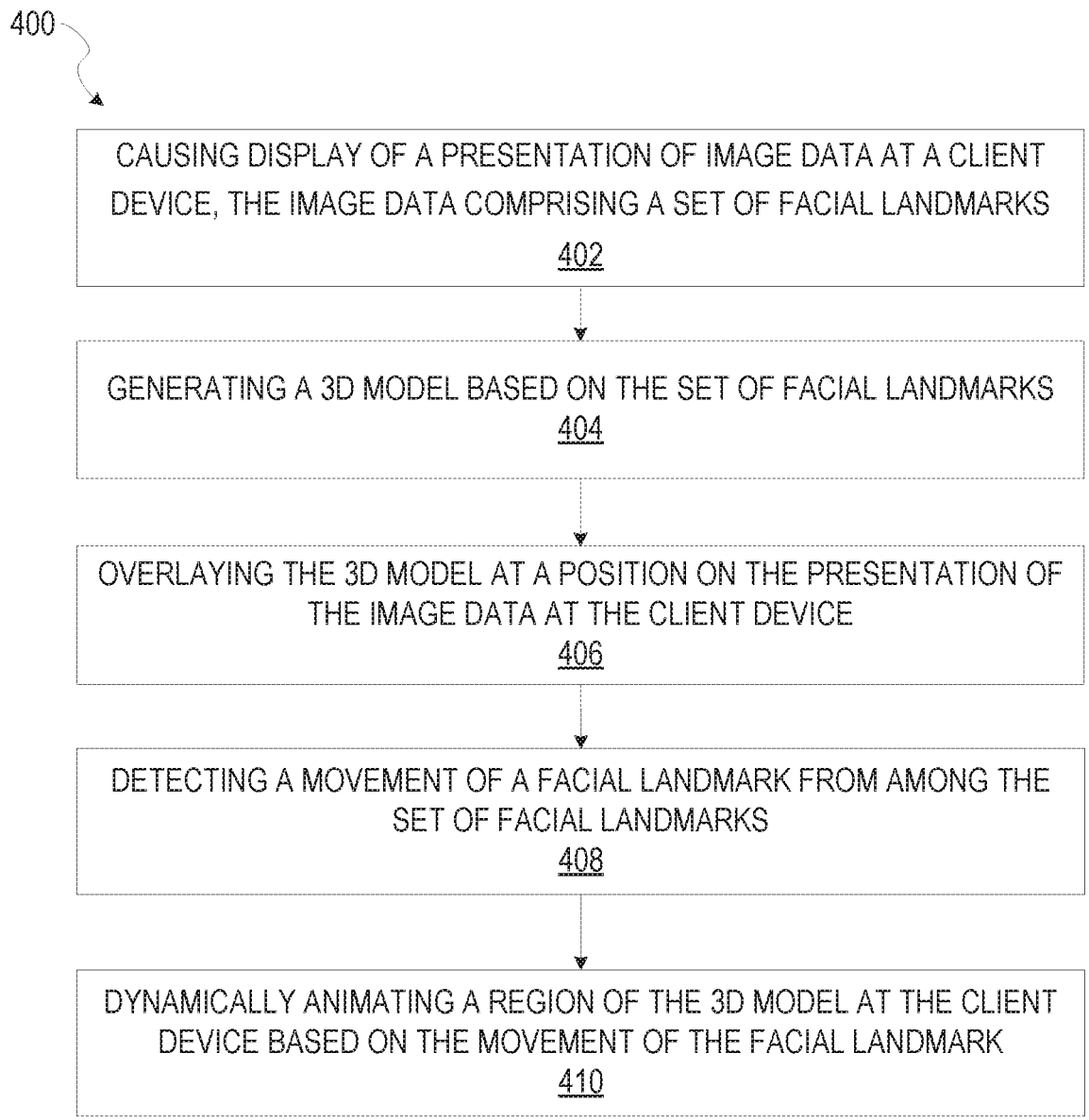
FIG. 4 is a flowchart illustrating a method for presenting an augmented reality display, according to certain example embodiments.

FIG. 4 is a flowchart illustrating a method 400 for presenting an augmented reality display, according to certain example embodiments. Operations of the method 400 may be performed by the modules described above with respect to FIG. 3. As shown in FIG. 4, the method 400 includes one or more operations 402, 404, 406, 408, and 410.

At operation 402, the presentation module 306 causes display of a presentation of image data at a client device (e.g., client device 102A), wherein the image data depicts a set of facial landmarks of a user. For example, the image data may be collected by a camera associated with the client device 102A, such as a front facing camera.

At operation 404, the modeling module 304 generates a 3D model (e.g., a 3D bitmoji) based on the set of facial landmarks, in response to the presentation module 306 displaying the presentation of the image data. In some embodiments, the modeling module 304 generates the 3D model in response to detecting the presence of facial landmarks within the image data. For example, the facial tracking module 302 may employ various facial motion capture methodologies including marker-based, as well as markerless technologies. Markerless facial motion capture methodologies identify and track facial movements and expressions based on facial landmarks, such as nostrils, corners of the lips and eyes, pupils, and wrinkles. In response to detecting the presence of such facial landmarks within the image data, the facial tracking module 302 causes the modeling module to generate the 3D model based on the identifies facial landmarks.

In some embodiments, the facial tracking module 302 identifies the user based on attributes of the identified set of facial landmarks, such as distances and slopes between each facial landmark, a size and shape of each facial landmark, as well as device attributes of the client device 102A (e.g., a device identifier), and retrieves a user profile associated with the user, wherein the user profile include display instructions for a 3D bitmoji.

In further embodiments, the modeling module 304 generates a 3D bitmoji on the fly, based on the attributes of the facial landmarks, such that the 3D bitmoji resembles the user. For example, the modeling module 304 may access a bitmoji repository that contains bitmoji elements, select a set of bitmoji elements based on the attributes of the facial landmarks, and generate the 3D bitmoji based on the selected bitmoji elements.

In some embodiments, the 3D bitmoji generated by the modeling module 304 comprises a set of bitmoji regions, wherein each region corresponds to a distinct facial landmark from among the set of facial landmarks (e.g., a region corresponding to the facial landmark that represents the user's mouth, a region corresponding to the facial landmark that represents the user's left eye, etc.). In further embodiments, the 3D bitmoji generated by the modeling module 304 comprises a blendshape that represents the set of facial landmarks as a series of vertex positions.

At operation 406, the presentation module 306 overlays the 3D bitmoji generated by the modeling module 304 at a position on the image data displayed at the client device 102A based on the locations of the set of facial landmarks. For example, the facial tracking module 302 may identify a set of reference features based on the set of facial landmarks and cause the presentation module 306 to overlay a presentation of the 3D bitmoji on the image data at the client device 102A.

At operation 408, the feature tracking module 302 receive a facial tracking input (e.g., a movement of a facial landmark from among the set of facial landmarks). For example, the user may open or close their mouth, raise an eyebrow, or turn their head. In response to the feature tracking module 302 receiving the facial tracking input, at operation 410 the presentation module 302 dynamically animates a region of the 3D bitmoji that corresponds to the facial landmark at the client device 102A. The 3D bitmoji displayed at the client device 102A mimics the user's movements and facial expressions.

Figure 5:
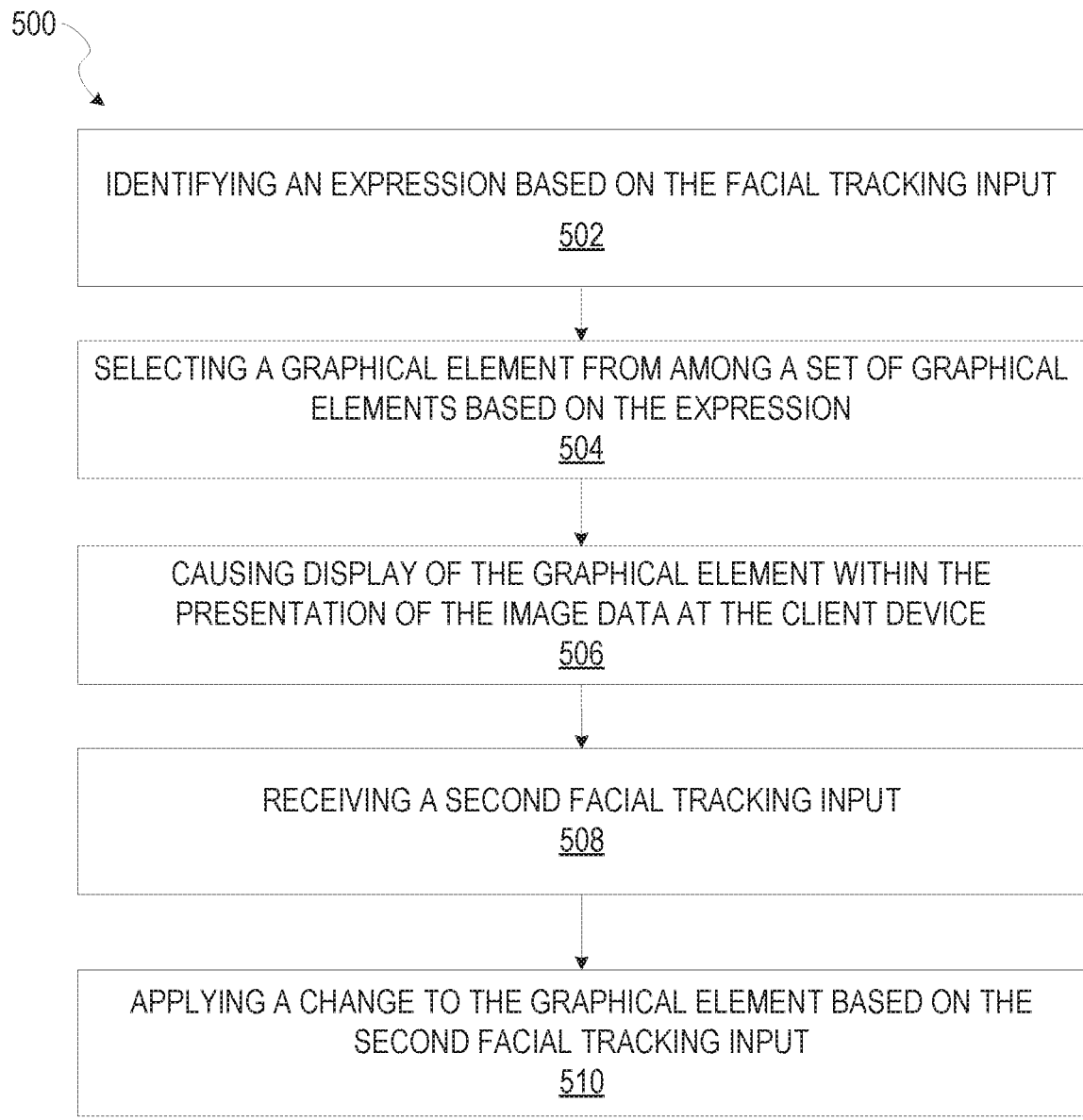
FIG. 5 is a flowchart illustrating a method for presenting an augmented reality display, according to certain example embodiments.

FIG. 5 is a flowchart illustrating a method 500 for presenting an augmented reality display, according to certain example embodiments. Operations of the method 500 may be performed by the modules described above with respect to FIG. 3. As shown in FIG. 5, the method 500 includes one or more operations 502, 504, 506, 508, and 510.

At operation 502, the facial tracking module 302 identifies an expression (e.g., a facial expression) of the user based on inputs received as movements and positions of the set of facial landmarks. For example, the facial tracking module 302 receives inputs that include a landmark identifier (e.g., nose, mouth, left eye, right eye), an input value that indicates how much the facial landmark has moved or changed relative to a static position, and a movement direction that indicates a direction of the movement. In response to receiving the inputs, the facial tracking module 302 accesses a repository that includes a set of expression definitions, wherein the expression definitions comprise a mapping of the various facial tracking inputs to predefined expressions.

In some embodiments, a user of the client device 102A explicitly provides the expression definitions via one or more user inputs. For example, a user may form their face into a particular expression and capture an image that depicts the expression at the client device 102A. The facial tracking module 302 determines relative positions of each facial landmark among the set of facial landmarks in the image, and assign the relative positions of the facial landmarks to a particular expression, which the user may assign an expression identifier as well as display instructions to. For example, the user may indicate that in response to detecting a particular expression based on facial tracking inputs, the augmented expression system 124 displays a particular graphical element within the presentation of the image data.

At operation 504, the modeling module 304 selects a graphical element from among a set of graphical elements based on the expression identified by the facial tracking module 302. For example, responsive to the facial tracking module 302 identifying an expression, the modeling module 304 retrieves the corresponding expression definition which includes instructions to display a particular graphical element, such as a 3D object, along with the presentation of the image data at the client device 102A.

At operation 506, the presentation module 306 causes display of the graphical element within the presentation of the image data at the client device 102A. In some embodiments, a location and orientation of the graphical element is based on the expression of the user. For example, each graphical element may include display instructions that define how and where in the presentation of the image data the graphical element is to be displayed, based on the locations, movements, and orientations of the set of facial landmarks tracked by the facial tracking module 302.

At operation 508, the facial tracking module 302 receives a second facial tracking input (e.g., a movement distinct from the previous movement). At operation 510 the presentation module 306 applies a change to the graphical element based on attributes of the second facial tracking input, such as an input value.

For example, the graphical element displayed within the presentation of the image data may include a 3D balloon displayed proximate to a region of the 3D bitmoji that represents the user's lips. The user may pucker their lips to indicate that they are blowing up the balloon. In response to detecting the movement of the user's lips, the presentation module 306 causes the 3D balloon to inflate as if the user was inflating it.

Figure 6:
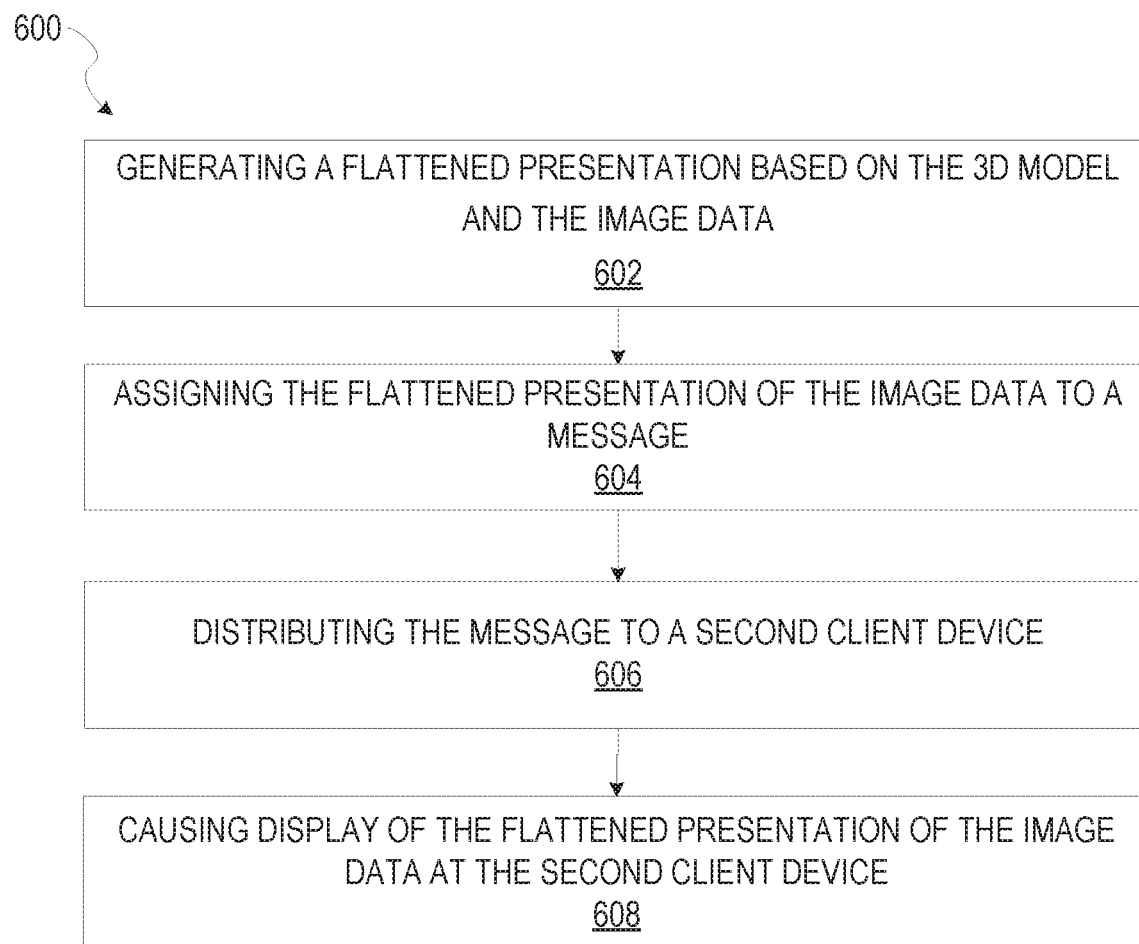
FIG. 6 is a flowchart illustrating a method for presenting an augmented reality display, according to certain example embodiments.

FIG. 6 is a flowchart illustrating a method 600 for presenting an augmented reality display, according to certain example embodiments. Operations of the method 600 may be performed by the modules described above with respect to FIG. 3. As shown in FIG. 6, the method 600 includes one or more operations 602, 604, 606, and 608.

At operation 602, the communication module 308 generates a flattened presentation based on the image data and the 3D bitmoji. The flattened presentation comprises a merging of the image data and the 3D bitmoji. After merging the image data and the 3D bitmoji into a single layer, at operation 604 the user of the client device 102A assigns the flattened presentation to a message. For example, the message may be addressed to one or more recipients, including a second client device 102B.

At operation 606, the communication module 308 distributes the message that includes the flattened presentation to the recipients including the second client device 102B. At operation 608, the presentation module 306 causes display of the flattened presentation at the second client device 102B, for example as an ephemeral message.

Figure 7:
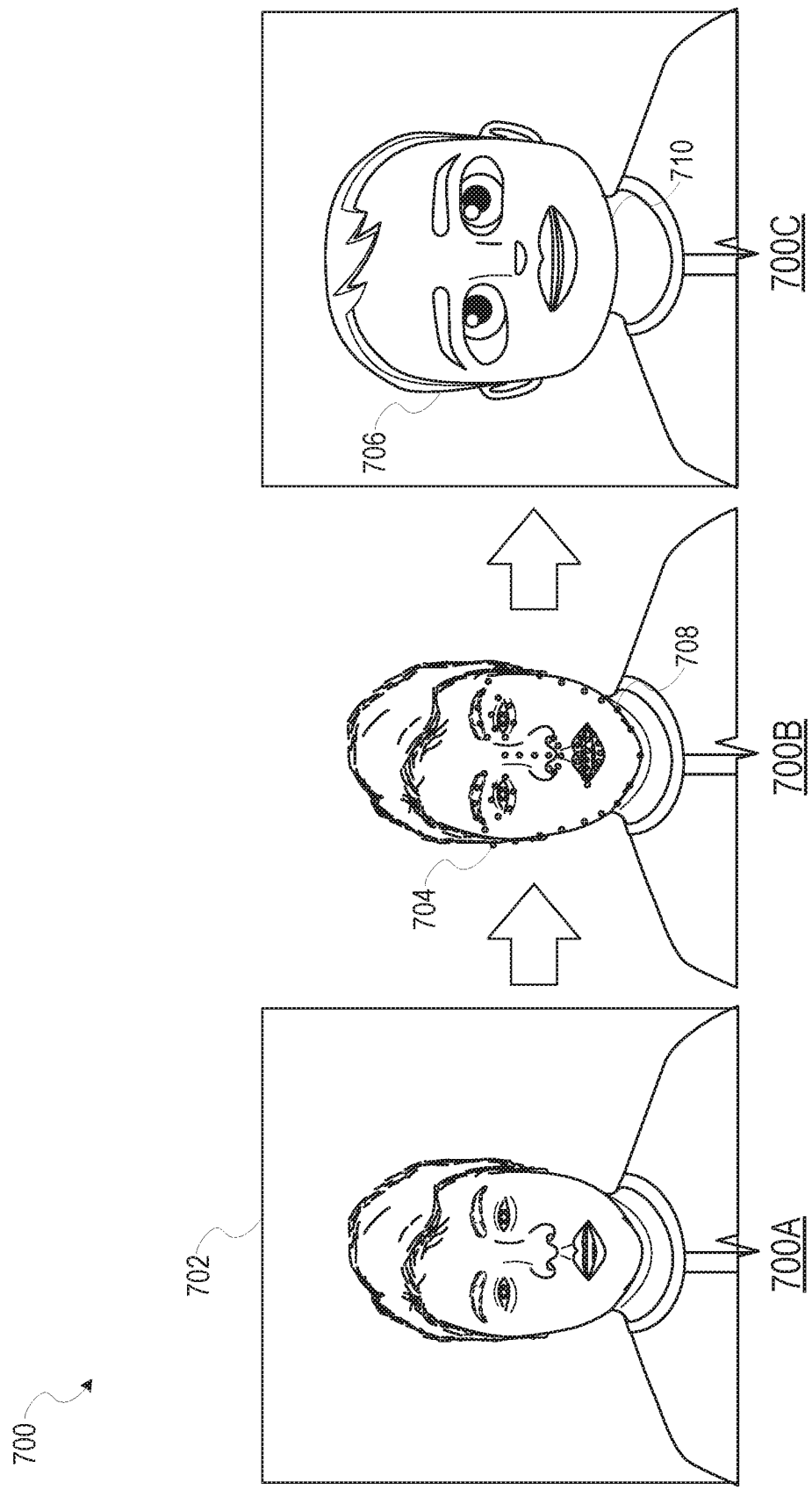
FIG. 7 is a flow diagram illustrating a method for generating a 3D model based on facial tracking inputs, according to certain example embodiments.

FIG. 7 is a flow diagram 700 illustrating a method for generating a 3D model based on facial tracking inputs, according to certain example embodiments. As seen in FIG. 7, the flow diagram 700 comprises steps 700A, 700B, and 700C.

Al step 700A, image data 702 is received at a client device 102A, as described at operation 402 of the method 400, in FIG. 4. For example, the image data 702 may be collected by a camera associated by the client device 102A, such as a front facing camera.

At step 700B, the facial tracking module 302 identifies a set of facial landmarks 704 within the image data 702. As seen in FIG. 7, the set of facial landmarks 704 may be represented as a distribution of points that represent facial landmarks of a user's face depicted in the image data 702. The facial landmarks 704 may for example include the tip of a nose, corners of the eyes, corners of eyebrows, corners of the mouth, and pupils. The distribution of points may be sub-divided into collections of points, such that each collection of points corresponds to a region of the 3D bitmoji 706. For example, the collection of points 708 that line a lower portion of the face depicted in the image data 702 may correspond with the lower portion 710 of the 3D bitmoji 706.

Al step 700C, the modeling module 304 generate a 3D bitmoji 706 based on the set of facial landmarks 704, as described at operation 404 of the method 400, in FIG. 4. As seen at step 700C of FIG. 7, the 3D bitmoji 706 is overlaid upon the image data 702, at a location based on the set of facial landmarks 704.

Figure 8:
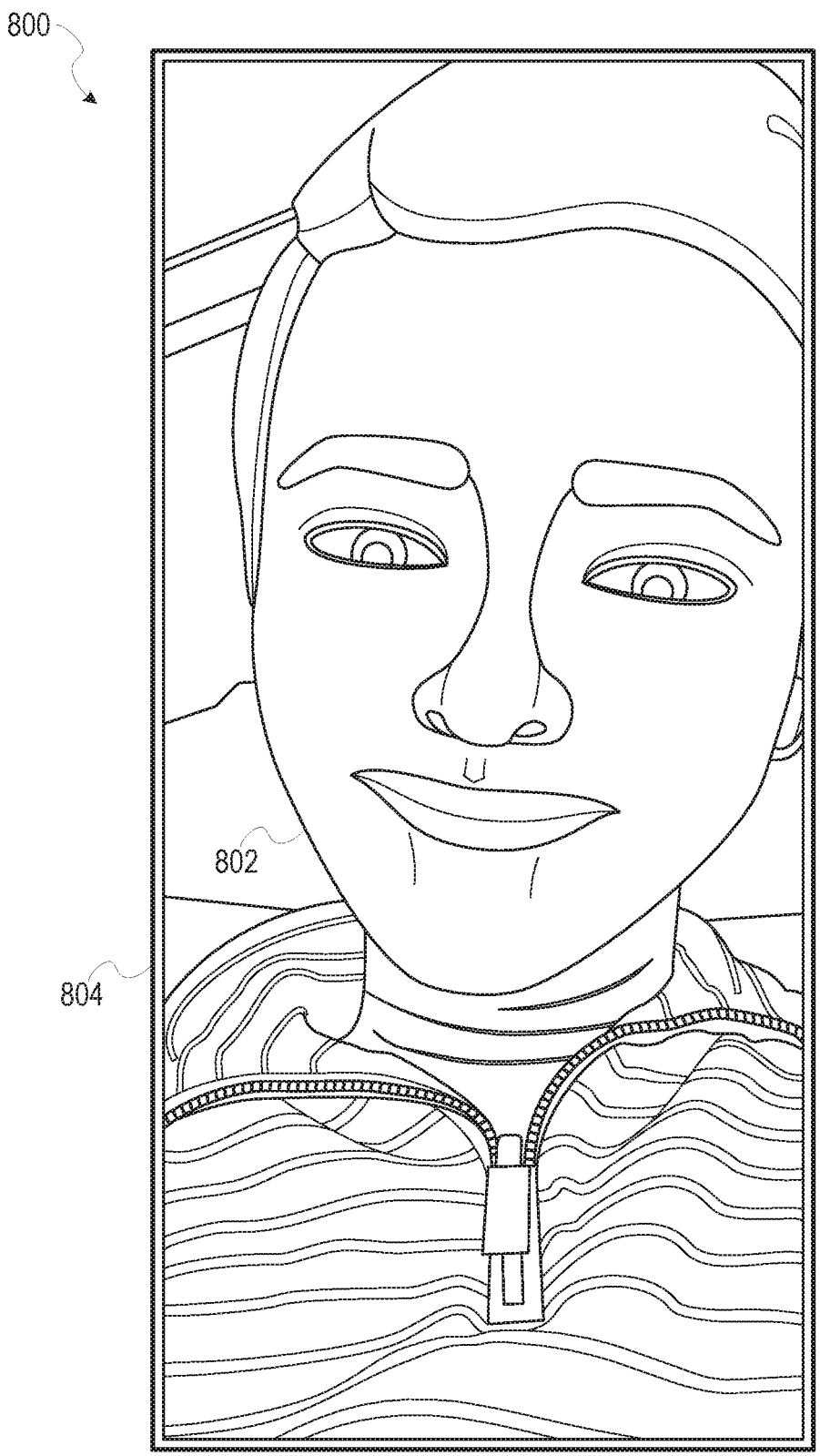
FIG. 8 is an illustration of an interface to display an augmented reality image, according to certain example embodiments.

FIG. 8 is an illustration 800 of an interface to display an augmented reality image, according to certain example embodiments. As seen in FIG. 8, the illustration 800 includes a depiction of a 3D bitmoji 802, overlaid upon image data 804, according to certain example embodiments such as those described in the method 400 of FIG. 4.

Figure 9:
FIG. 9 is an illustration of an interface to display an augmented reality image, according to certain example embodiments.

FIG. 9 is an illustration 900 of an interface to display an augmented reality image, according to certain example embodiments. As seen in FIG. 9, the illustration 900 includes a depiction of a 3D bitmoji 902 overlaid upon image data 904. The illustration 900 also includes an interface item 906, to receive a user input to record content that includes composite presentations comprising the image data 804 and the 3D bitmoji 902.

As seen in FIG. 9, the 3D bitmoji 902 comprises an exaggerated depiction of an expression identified by the augmented expression system 124, as described in the method 500 of FIG. 5. In response to detecting a particular expression based on one or more facial tracking inputs received at the client device 102A, the augmented expression system 124 causes the 3D bitmoji to present of the exaggerated depiction of the expression.

Figure 10:
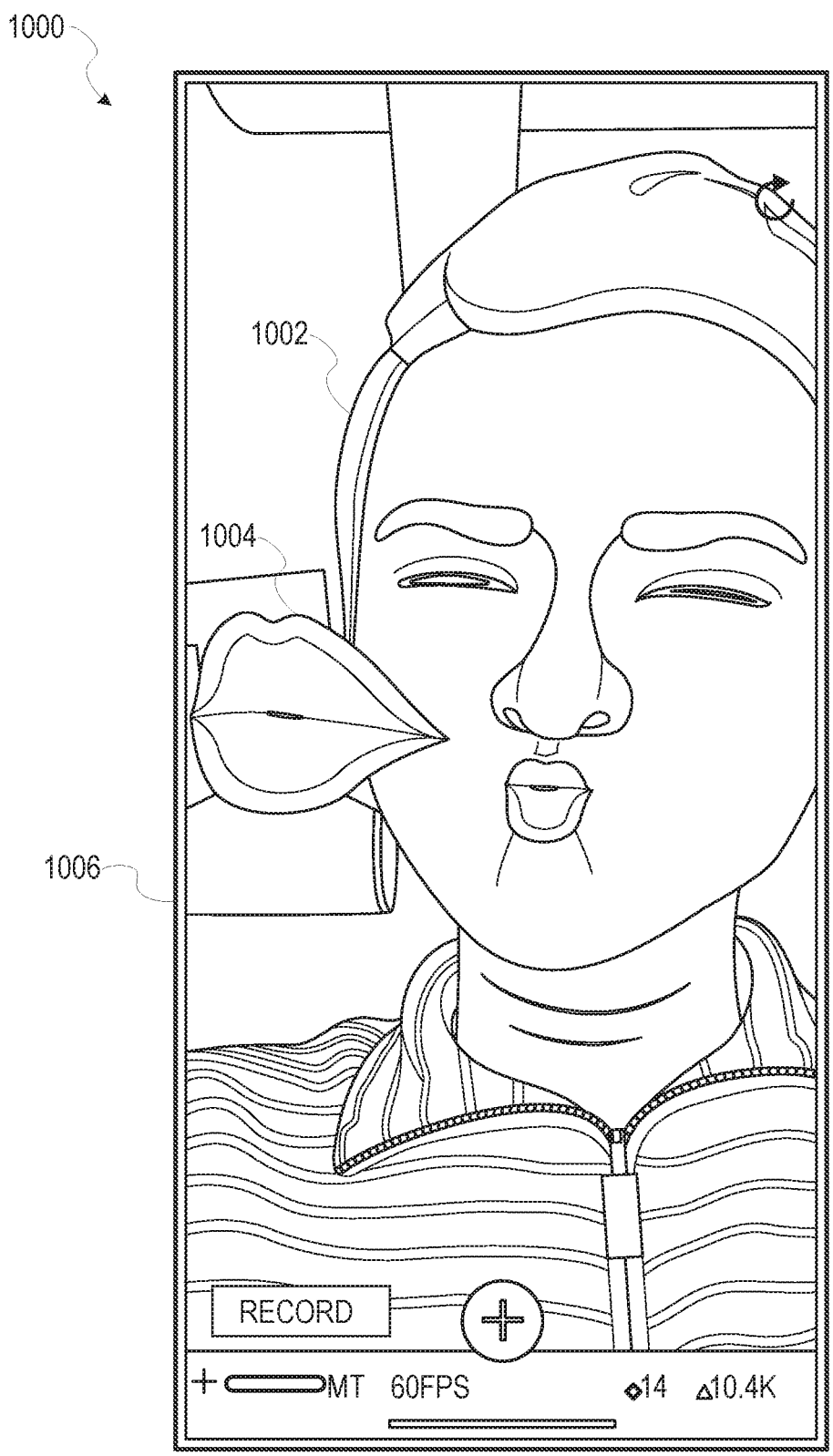
FIG. 10 is an illustration of an interface to display an augmented reality image, according to certain example embodiments.

FIG. 10 is an illustration 1000 of an interface to display an augmented reality image, according to certain example embodiments. As seen in FIG. 10, the illustration 10 includes a 3D bitmoji 1002, a graphical element 1004, overlaid upon image data 1006, according to certain example embodiments such as those described in the method 500 of FIG. 5.

For example, in response to the facial tracking module 302 receiving a facial tracking input corresponding to a particular expression (e.g., the user puckering his lips), the presentation module 306 causes display of the graphical element 1004 at a position in the image data 1006.

Software Architecture

Figure 11:
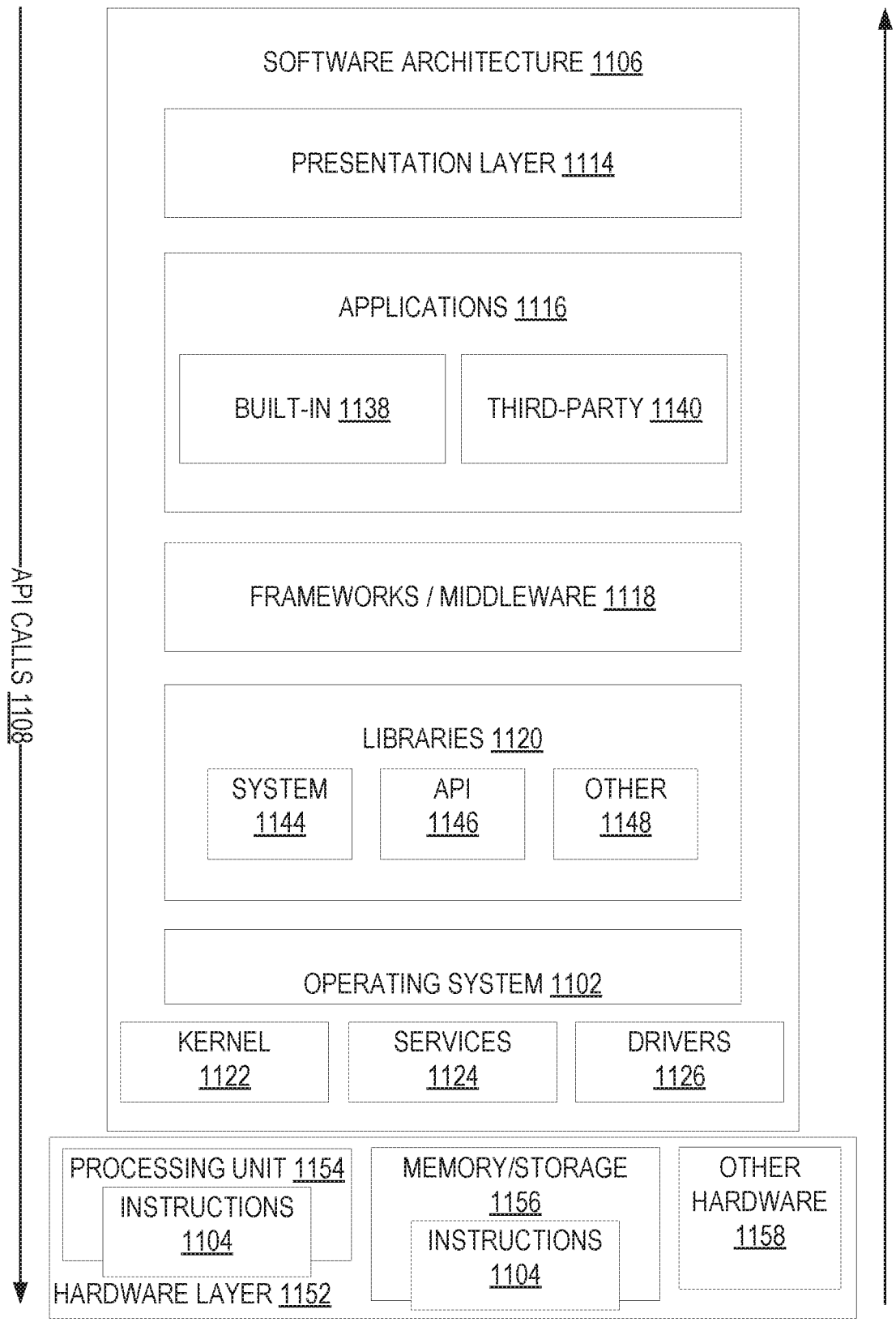
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 1200 of FIG. 12 that includes, among other things, processors 1204, memory 1214, and I/O components 1218. A representative hardware layer 1152 is illustrated and can represent, for example, the machine 1100 of FIG. 11. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126, The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126), The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
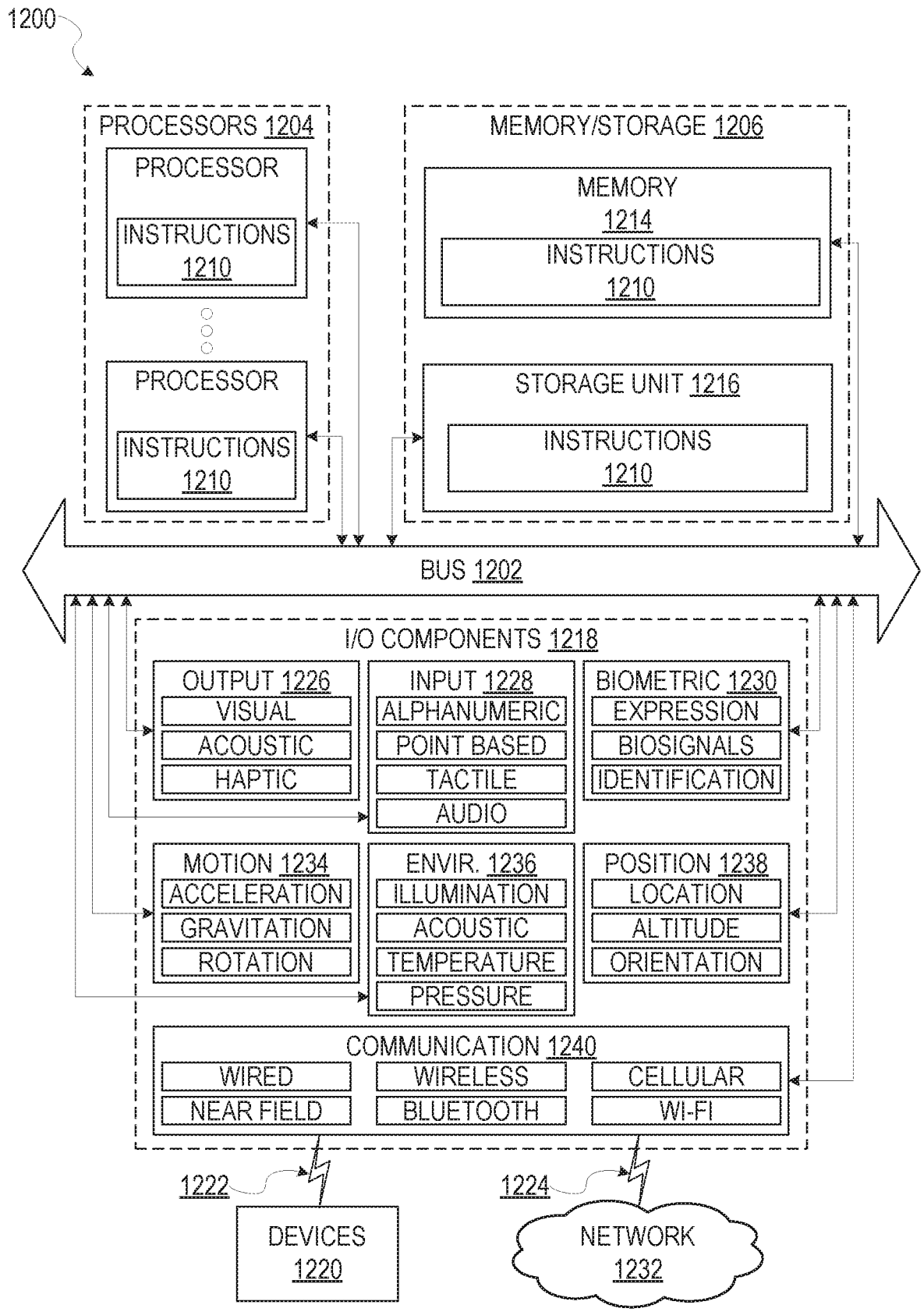
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components, Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
receiving an input that assigns a graphical element from among a plurality of graphical elements to an expression within a data repository associated with a client device;

causing display of a presentation of image data at the client device, the image data depicting a set of facial landmarks of a user;

determining attributes of the set of facial landmarks, the attributes including at least a size and a shape of each facial landmark among the set of facial landmarks;

generating a 3D model comprises characteristics that corresponds with the attributes of the set of facial landmarks, and user profile data associated with the user;

receiving a facial tracking input that comprises a movement of a facial landmark from among the set of facial landmarks of the user;

detecting the expression assigned to the graphical element within the presentation of the image data based on the movement of the facial landmark from among the set of facial landmarks;

accessing the graphical element that corresponds with the expression from within the data repository based on the input that assigns the graphical element to the expression within the data repository responsive to the detecting the expression within the presentation of the image data;

applying the graphical element to a position upon the 3D model at the client device; and generating a message that includes a presentation of the 3D model that includes the graphical element.

2. The method of claim 1, wherein the message includes an ephemeral message that comprises a display duration.

3. The method of claim 1, wherein the causing display of the presentation of the image data at the client device includes:
receiving an input that selects the image data from among a collection of image data.

4. The method of claim 1, wherein the applying the graphical element to the position upon the 3D model at the client device includes:
overlaying the graphical element at the position upon the image based on the set of facial landmarks.

5. A system comprising:
a memory; and
at least one hardware processor coupled to the memory and comprising instructions that causes the system to perform operations comprising:

receiving an input that assigns a graphical element from among a plurality of graphical elements to an expression within a data repository associated with a client device;

causing display of a presentation of image data at the client device, the image data depicting a set of facial landmarks of a user;

determining attributes of the set of facial landmarks, the attributes including at least a size and a shape of each facial landmark among the set of facial landmarks;

generating a 3D model that comprises characteristics that corresponds with the attributes of the set of facial landmarks, and user profile data associated with the user;

receiving a facial tracking input that comprises a movement of a facial landmark from among the set of facial landmarks of the user;

detecting the expression assigned to the graphical element within the presentation of the image data based on the movement of the facial landmark from among the set of facial landmarks;

accessing the graphical element that corresponds with the expression from within the data repository based on the input that assigns the graphical element to the expression within the data repository responsive to the detecting the expression within the presentation of the image data;

applying the graphical element to a position upon the 3D model at the client device; and generating a message that includes a presentation of the 3D model that includes the graphical element.

6. The system of claim 5, wherein the message includes an ephemeral message that comprises a display duration.

7. The system of claim 5, wherein the causing display of the presentation of the image data at the client device includes:
receiving an input that selects the image data from among a collection of image data.

8. The system of claim 5, wherein the applying the graphical element to the position upon the 3D model at the client device includes:
overlaying the graphical element at the position upon the image based on the set of facial landmarks.

9. A non-transitory machine-readable storage medium comprising instructions that, when executed by one or more processors of a machine, cause the machine to perform operations comprising:

receiving an input that assigns a graphical element from among a plurality of graphical elements to an expression within a data repository associated with a client device;

causing display of a presentation of image data at the client device, the image data depicting a set of facial landmarks of a user;

determining attributes of the set of facial landmarks, the attributes including at least a size and a shape of each facial landmark among the set of facial landmarks;

generating a 3D model that comprises characteristics that corresponds with the attributes of the set of facial landmarks, and user profile data associated with the user;

receiving a facial tracking input that comprises a movement of a facial landmark from among the set of facial landmarks of the user;

detecting the expression assigned to the graphical element within the presentation of the image data based on the movement of the facial landmark from among the set of facial landmarks;

accessing the graphical element that corresponds with the expression from within the data repository based on the input that assigns the graphical element to the expression within the data repository responsive to the detecting the expression within the presentation of the image data;

applying the graphical element to a position upon the 3D model at the client device; and generating a message that includes a presentation of the 3D model that includes the graphical element.

10. The non-transitory machine-readable storage medium of claim 9, wherein the message includes an ephemeral message that comprises a display duration.

11. The non-transitory machine-readable storage medium of claim 9, wherein the causing display of the presentation of the image data at the client device includes:
receiving an input that selects the image data from among a collection of image data.

12. The non-transitory machine-readable storage medium of claim 9, wherein the applying the graphical element to the position upon the 3D model at the client device includes:

overlaying the graphical element at the position upon the image based on the set of facial landmarks.

\* \* \* \* \*